(12) United States Patent
Jokschas et al.

(10) Patent No.: US 10,137,390 B2
(45) Date of Patent: Nov. 27, 2018

(54) FILTER DEVICE, ESPECIALLY LIQUID FILTER

(71) Applicant: MANN+HUMMEL GMBH, Ludwigsburg (DE)

(72) Inventors: Guenter Jokschas, Murrhardt (DE); Heike Kluson-Hesslinger, Freiberg (DE); Andre Roesgen, Remshalden (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 541 days.

(21) Appl. No.: 14/335,898

(22) Filed: Jul. 19, 2014

(65) Prior Publication Data

US 2015/0014239 A1 Jan. 15, 2015

Related U.S. Application Data

(62) Division of application No. 12/810,198, filed as application No. PCT/EP2008/067904 on Dec. 18, 2008.

(30) Foreign Application Priority Data

Dec. 21, 2007 (DE) .................. 20 2007 018 076 U

(51) Int. Cl.
*B01D 29/15* (2006.01)
*B01D 35/00* (2006.01)
*B01D 29/21* (2006.01)

(52) U.S. Cl.
CPC ............ *B01D 29/15* (2013.01); *B01D 29/21* (2013.01); *B01D 35/005* (2013.01); *B01D 2201/291* (2013.01); *B01D 2201/34* (2013.01)

(58) Field of Classification Search
None
See application file for complete search history.

(56) References Cited

U.S. PATENT DOCUMENTS

| 8,157,107 | B2* | 4/2012 | Weindorf | B01D 35/153 210/130 |
| 8,286,804 | B2* | 10/2012 | Weindorf | B01D 35/147 210/130 |
| 2002/0036165 | A1* | 3/2002 | Sommer | B01D 46/2414 210/438 |
| 2002/0100720 | A1* | 8/2002 | Jainek | B01D 35/153 210/248 |
| 2003/0146149 | A1* | 8/2003 | Binder | B01D 29/21 210/497.01 |

* cited by examiner

*Primary Examiner* — Benjamin M Kurtz
(74) *Attorney, Agent, or Firm* — James Hasselbeck

(57) ABSTRACT

A filter device comprises a hollow cylindrical filter element in a filter housing. The fluid that is to be purified is to radially flow through the filter element. The interior of the filter element forms an axial flow chamber for the fluid. An end plate is arranged on the front side of the filter element. An annular neck, onto which a sealing element is injection-molded, is connected to the end plate.

8 Claims, 2 Drawing Sheets

FILTER DEVICE, ESPECIALLY LIQUID FILTER

CROSS REFERENCE TO RELATED APPLICATIONS

This application is a divisional of U.S. application Ser. No. 12/810,198 filed Oct. 12, 2010, which is a US National Stage Entry of international patent application no. PCT/EP2008/067904, filed Dec. 18, 2008 designating the United States of America, the entire disclosure of which is incorporated herein by reference. Priority is claimed based on German patent application 20 2007 018 076.4 filed in Germany on Dec. 21, 2007.

TECHNICAL FIELD

The invention concerns a filter device, especially a liquid filter, such as a fuel filter or oil filter, according to the preamble of claim 1.

PRIOR ART

A filter device that is used as an oil filter or a fuel filter is disclosed in DE 197 46 752 A1. The filter device comprises a hollow cylindrically embodied filter element that is secured on a radially inwardly positioned support structure and is flowed through by the fluid to be purified radially from the exterior to the interior wherein the filter interior forms an axial discharge passage for the purified fluid. The filter element is framed by terminal disks at the end faces that have a central cutout for discharging the fluid from the filter interior. In the central cutout of the terminal disk a sealing ring is inserted that is supported on an inner housing wall and separates the axial discharge space from the inflow side of the filter element. Such sealing elements are mandatorily required for a flow-tight separation of raw side and clean side.

SUMMARY OF THE INVENTION

The invention has the object to separate with simple means and in a space-saving as well as effective way the raw side from the clean side in a filter device.

This object is solved according to the invention with the features of claim 1. The dependent claims provide expedient further embodiments.

The filter device has in a filter housing a hollow cylindrical filter element that is to be flowed through by the fluid to be purified in radial direction. The interior of the filter element forms an axial flow space. At one end face of the filter element there is a terminal disk where the sealing element is arranged. According to the invention, this sealing element is injection-molded onto an axially projecting, annular socket that is connected to the terminal disk.

With this embodiment different advantages are achieved. By injection-molding the sealing element separate assembly steps are no longer required that in an embodiment of the sealing element as its own component, in particular as a sealing ring, would be otherwise required. In the embodiment according to the invention, it is instead sufficient to injection-mold, before mounting the filter device, the sealing material onto the annular socket; subsequently, the filter element including sealing disk and socket together with the injection-molded sealing element can be inserted into the filter housing. Leakage flows caused by mounting are prevented in this way.

Moreover, the stability of the filter device is improved because forces in the axial direction are transmitted substantially from the socket onto the filter housing. This means that the sealing element is positioned between the end face of the socket and the inner wall of the filter housing; since this section of the sealing element is however usually very thin-walled, a tilted positioning of the filter device that could lead to leakage flows is not to be expected as a result of the deformation of the sealing element.

According to an advantageous embodiment, the sealing element is comprised of an injection-moldable silicone material, in particular a fluorosilicone rubber (FVMQ) that is characterized by an excellent fuel resistance, in particular by excellent diesel fuel resistance and therefore in a special way is suitable for use in fuel filters.

According to a further advantageous embodiment, the socket has shaped elements that contribute to an improved adhesion of the sealing material on the socket. These shaped elements change the surface of the socket and are embodied as projections or, according to a preferred embodiment, as cutouts in the wall of the socket. In the embodiment as cutouts, they can be distributed uniformly about the circumference of the socket. During the injection molding step, the sealing material will deposit on the shaped elements so that an additional resistance with respect to accidental removal of the sealing material from the socket is provided. In case of the cutouts in the wall of the socket, the cutouts are advantageously completely filled with the sealing material so that no leakage flows through these cutouts may occur.

The sealing material is expediently injection-molded onto the inner side, the outer side as well as the free end face of the socket so that the best possible sealing action is achieved. Even though, it is in principle sufficient to provide the sealing material only on the inner side or only on the outer side or optionally to provide the sealing material only on the end face of the socket or on a combination of end face and inner side or outer side of the socket.

The annular socket in its simplest embodiment is a cylinder whose side walls and free end face form the support for the sealing material. However, other geometries may be provided also for the socket, for example, a socket with a cylindrically shaped section and a further section angularly extending therefrom or a socket with a slantedly extending wall that is positioned at an angle to the plane at the terminal disk. The sealing material may extend either about the entire inner side and outer side of the socket or, according to a further embodiment, only across a partial area of the socket, for example, on the angularly projecting section of the socket.

According to yet another advantageous embodiment, two concentric sockets are provided that are spaced apart radially from one another wherein the sealing material is injection-molded onto both sockets. Since each one of the two sealing elements is provided with a sealing line, the sealing action is improved.

The socket is advantageously embodied as a monolithic part of the terminal disk; both components can be manufactured of injection-moldable plastic material. Basically, it is however also possible to embody socket and terminal disk as two separate components that are connected to one another

BRIEF DESCRIPTION OF THE DRAWINGS

Further advantages and expedient embodiments may be taken from the additional claims, the figure description, and the drawings. It is shown in:

EMBODIMENTS OF THE INVENTION

Figure 1:
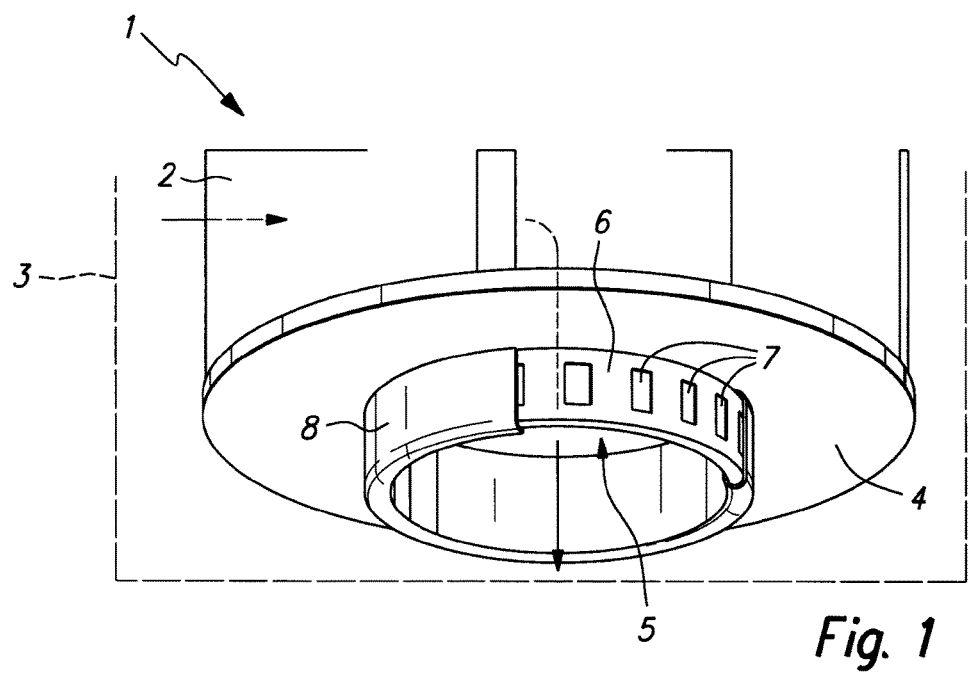
FIG. 1 a perspective view of the lower part of a filter device with a hollow cylindrical filter element whose end face is framed by a terminal disk that is provided with a central cutout for discharging the purified fluid, wherein the central cutout is surrounded by a socket onto which sealing material is injection-molded.

In the Figures the same components are identified with same reference numerals.

The filter devices illustrated in the Figures are suitable for filtration of liquid or gaseous fluids, in particular for filtering fuel such as diesel fuel or oil. Also, a use, for example, as an air filter is possible.

The filter device 1 illustrated in FIG. 1 comprises a hollow cylindrical filter element 2 in a filter housing 3 wherein the filter element 2 is flowed through radially from the exterior to the interior by the fluid to be purified so that the outer wall surface represents the raw side and the axial interior in the filter element represents the clean side from where the purified fluid is discharged axially through the end face. The axial end face of the filter element 2 is framed by a terminal disk 4 that has a central cutout 5 that communicates with the axial interior of the filter element 2. In the central cutout 5 a cylindrical socket 6 is inserted that advantageously is monolithically formed with the terminal disk 4. In the wall of the socket 6 a plurality of cutouts 7 are provided that are distributed uniformly about the circumference and penetrate the wall. The socket 6 is a support for a sealing element 8 that is comprised of an injection-moldable material, in particular of a silicone material such as partially fluorinated liquid silicone (FVMQ) and is injection-molded onto the socket 6. The sealing material is located on the outer side, the inner side and the free end face of the socket 6 and covers also completely the cutouts 7 in the wall of the socket 6. The cutouts 7 have the function of shaped elements that ensure improved adhesion of the sealing material on the socket 6.

The selection of the sealing material depends on the fluid to be purified. For use as a diesel fuel filter, advantageously the aforementioned material FVMQ is used that is characterized by high fuel resistance while at the same time providing excellent injection molding properties.

Figure 2:
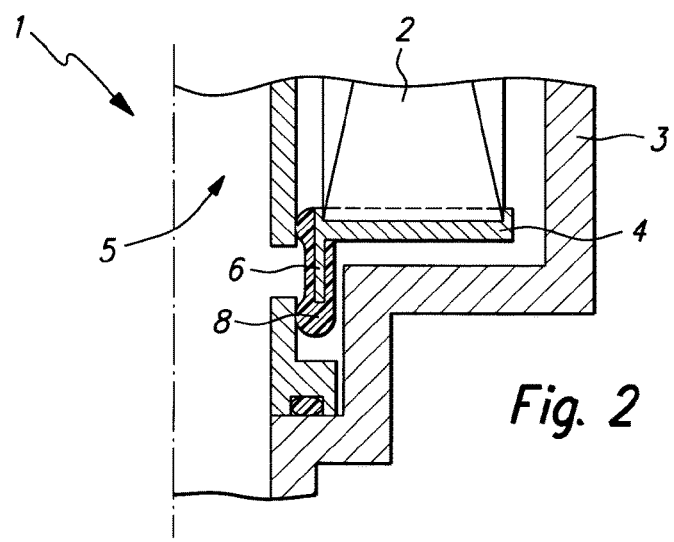
FIG. 2 a section view of the filter device according to FIG. 1 in the area of the socket.

As illustrated in the section view of FIG. 2, the socket 6 is formed monolithically with the terminal disk 4. The sealing element 8 has two contact lines: on the one hand, in the area of the free end face on the socket 6 and, on the other hand, at the transition area between socket 6 and terminal disk 4 on the side facing away from the central cutout 5. In the area of the two contact lines the sealing element 8 has a greater wall thickness. In order to design the seal to be more resistant with regard to high pressure peaks, in a supplemental embodiment a circumferentially extending reinforcement ring may be provided in the area of the seal support. This ring is positioned circumferentially below or on the seal 8. There is also the possibility to employ high-strength sealing materials or sealing materials that have a high tear resistance.

Figure 3:
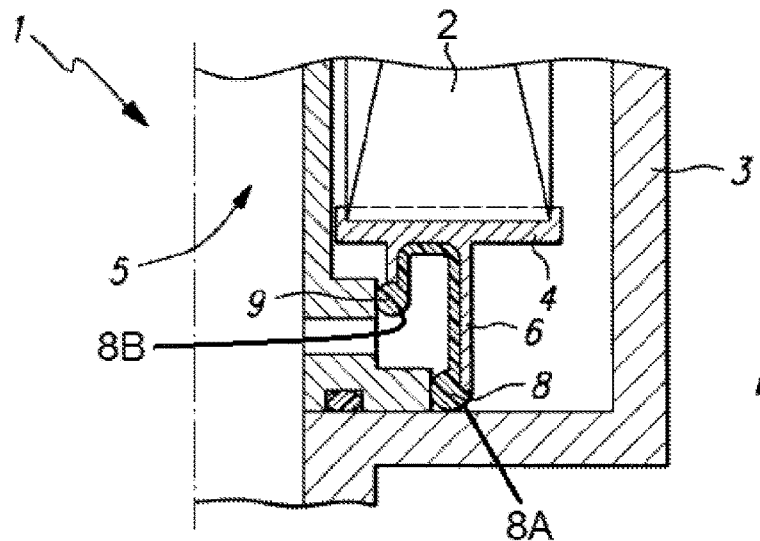
FIG. 3 a section illustration of a further embodiment according to which two sockets concentrically arranged relative to one another are provided onto which sealing material is injection-molded, respectively.

In the embodiment according to FIG. 3, on the terminal disk 4 a second socket 9 is provided that extends concentrically relative to the first socket 6 but in comparison to the first socket 6 has a smaller diameter. Also, the axial extension of the second socket 9 is less than that of the first socket 6. The second socket 9 is also formed as a monolithic part with the terminal disk 4 as is the first socket 6. The sealing element 8 is injection-molded onto the first socket 6 as well as onto the second socket 9 and extends along the inner side of the first socket 6, on the inner and outer sides of the second socket 9 as well as in the intermediate area on the terminal disk 4 between first and second sockets 6 and 9, forming a generally U-shaped sealing element 8, as shown in FIG. 3. Moreover, the two free end faces of the sockets 6 and 9 are covered with sealing material. The sealing element 8, at the free end faces of the sockets 6 and 9, has a greater wall thickness, forming bulbous shaped sealing members 8A, 8B on the free end faces of the sockets 6 and 9, as clearly shown in FIG. 3. The wall of the first socket 6 and second socket 9 may include a plurality of cutouts 7 (see FIG. 1) distributed uniformly about the circumference and penetrating the wall. The cutouts 7 (see FIG. 1) have the function of shaped elements that ensure improved adhesion of the sealing material on the sockets. The sealing material may be located on the outer side, the inner side and the free end face of the sockets cover also completely the cutouts in the wall of the sockets, if present.

Support is found directly in originally filed FIG. 3.

There are a total of two sealing lines between the sealing element 8 and the filter housing or the components of the housing; both sealing lines are located in the area of the free end faces of the sockets 6 and 9.

Figure 4:
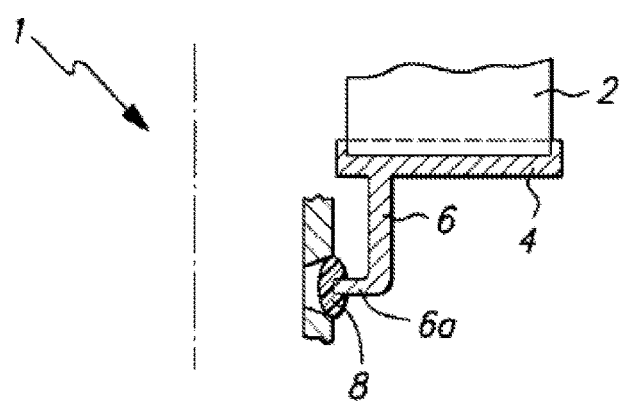
FIG. 4 a further embodiment in which the socket has additionally an angularly arranged section that is a support for the sealing element.

In the embodiment according to FIG. 4, the cylindrical socket 6 in the area of its end face is provided with a section 6a that is radially inwardly angled at a 90 degree angle whose free end face is a support of the injection-molded sealing element 8.

Figure 5:
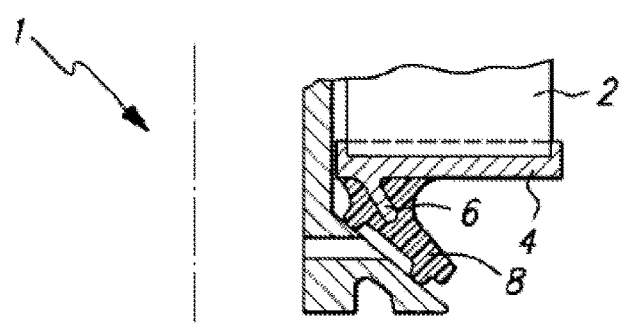
FIG. 5 a further embodiment in which the socket is comprised of a slantedly extending wall that is formed monolithically with the terminal disk.

In the embodiment according to FIG. 5 the socket 6 that is a monolithic part with the terminal disk 4 is angularly embodied; it is positioned relative to the plane of the terminal disk 4 at an angle deviating from 90 degrees and is oriented radially outwardly. The sealing element 8 that is injection-molded on the socket 6 engages the end face of the socket as well as the inner side and the outer side and has a relatively complex cross-sectional geometry. Two sealing lines are formed by means of which the sealing element 8 is seal-tightly supported on a further component of the filter device.

The invention claimed is:

1. A liquid filter device for filtering oil or fuel, comprising:
    a hollow cylindrical filter element for arrangement in a filter housing that is radially to be flowed through by the oil or fuel to be purified;
    wherein an open interior of said filter element forms an axial flow space for said oil or fuel in said open interior;
    said filter element further comprising
        a terminal disk arranged on an axial end face of the filter element, the terminal disk having an open central portion opening through said terminal disk into said open interior;
        a first axially projecting annular socket having a first axial end secured onto said terminal disk and projecting axially outwardly to an opposing free end of the first axially projecting annular socket, said first axially projecting annular socket including an axially outwardly projecting annular wall circumferentially surrounding the open central portion;

a second axially projecting annular socket having a second axial end secured onto said terminal disk and arranged concentrically to and surrounded by said first axially projecting annular socket, said second axially projecting annular socket including a second axially outwardly projecting annular wall surrounding the open central portion, said second axially projecting annular socket projecting axially outwardly to an opposing second free end of the second axially projecting annular socket, wherein the second axially projecting annular socket projects axially outwardly a smaller axial distance than the first axially projecting annular socket;

a U-shaped sealing element of a sealing material, having:
- a first bulbous sealing member formed by a first end of the U-shaped sealing element, the first bulbous sealing member arranged directly on and covering an axial end face of the opposing free end of the first axially projecting annular socket;
- a second bulbous sealing member formed by an opposite second end of the U-shaped sealing element, the second bulbous sealing member arranged directly on and covering an axial end face of the opposing second free end of the second axially projecting annular socket;
- wherein the U-shaped sealing element extends from the first bulbous sealing member, axially inwardly on a radially inner surface of the first axially projection annular socket, continuing across an intermediate outer surface of the terminal disk, extending axially outwardly on a radially outer surface of the second axially projection annular socket to terminate at the second bulbous sealing member;
- wherein the first bulbous sealing member projects radially inwardly from the first axially projecting annular socket towards the second bulbous sealing member;
- wherein the second bulbous sealing member projects radially inwardly from the second axially projecting annular socket;
- wherein the bulbous sealing members have a greater wall thickness than other portions of the U-shaped sealing element;
- wherein the U-shaped sealing element ends at the first and second bulbous sealing members, the U-shaped sealing element covering only one radial side of each axially projecting annular socket;

wherein the U-shaped sealing element is operative to form a seal between said terminal disk and said filter housing to seal between a raw side and a clean side of said filter element.

2. The filter device of claim 1, wherein said axially projecting annular sockets are formed monolithically and in one piece with said terminal disk.

3. The filter device of claim 1, wherein said sealing material is comprised of a silicone material.

4. The filter device of claim 3, wherein said silicone material is a fluorine-silicone-rubber (FVMQ).

5. The filter device of claim 1, wherein at least one of the first or second axially projecting annular sockets includes shaped elements formed thereon and configured to improve adhesion of said U-shaped sealing element onto said at least one of the first or second axially projecting annular socket sockets respectively.

6. The filter device of claim 5, wherein said shaped elements are embodied as cutouts extending radially through and formed into said axially outwardly projecting annular wall of said first axially projecting annular socket or said second axially outwardly projecting annular wall of said second axially projecting annular socket.

7. The filter device of claim 6, wherein
The U-shaped sealing element covers the cutouts of the respective at least one of the first or second axially projecting annular sockets.

8. The filter device of claim 1, wherein
the U-shaped first sealing element is a unitary one-piece.

* * * * *